United States Patent [19]

Moses

[11] 4,177,683

[45] Dec. 11, 1979

[54] POWER TRANSMISSION MECHANISM

[75] Inventor: Darcy C. Moses, Rush City, Minn.

[73] Assignee: Darmo Corporation, Thief River Falls, Minn.

[21] Appl. No.: 834,279

[22] Filed: Sep. 19, 1977

[51] Int. Cl.² .................... F16H 13/02; F16H 13/04
[52] U.S. Cl. ...................................... 74/200; 74/198; 74/199
[58] Field of Search ................ 74/198, 199, 200, 201, 74/193

[56] References Cited

U.S. PATENT DOCUMENTS

| Re. 29,631 | 5/1978 | Schott | 74/198 |
|---|---|---|---|
| 491,866 | 2/1893 | Behr | 74/199 |
| 788,615 | 5/1905 | Weller | 74/198 |
| 1,013,737 | 1/1912 | Brown | 74/201 |
| 1,178,834 | 4/1916 | Beland | 74/191 |
| 2,209,254 | 7/1940 | Ahnger | 74/198 |
| 2,469,673 | 5/1949 | Whitmore | 74/200 |
| 2,503,310 | 4/1950 | Weiss | 74/200 |
| 2,512,717 | 6/1950 | Dicke | 74/198 |
| 2,951,384 | 9/1960 | Rouverol | 74/200 |
| 3,115,044 | 12/1963 | Andrews | 74/200 |
| 3,698,255 | 10/1972 | Schott | 74/193 |
| 3,800,606 | 4/1974 | Schott | 74/198 |
| 3,851,534 | 12/1974 | Stober | 74/193 |

FOREIGN PATENT DOCUMENTS

| 1146321 | 3/1963 | Fed. Rep. of Germany | 74/200 |
|---|---|---|---|
| 589783 | 5/1959 | Italy | 74/199 |
| 792554 | 3/1958 | United Kingdom | 74/199 |

Primary Examiner—Samuel Scott
Assistant Examiner—William R. Henderson
Attorney, Agent, or Firm—Merchant, Gould, Smith, Edell, Welter & Schmidt

[57] ABSTRACT

A variable power transmission mechanism including a first disc rotatable about a first axis and having a flat surface perpendicular to the first axis, a second disc rotatable about a second axis and providing a flat surface perpendicular to the second axis, apparatus positioning the first and second discs in spaced apposition so that the flat surfaces define planes intersecting at an acute dihedral angle and including a ratio varying arrangement for causing displacement between the discs in a direction aligned with the vertex of the dihedral angle, a ball which makes contact with the surfaces along circles concentric with the respective axes and is resiliently urged toward the vertex of the dihedral angle, a guide for causing displacement of the ball in a direction aligned with the vertex, and an interconnection between the ratio varying arrangement and the ball guide for causing displacement of the latter simultaneously with and proportional to displacement between the discs. An embodiment is shown in which two transmission mechanisms are serially interconnected by a sprocket chain and have their ratio varying arrangements connected for simultaneous operation.

17 Claims, 11 Drawing Figures

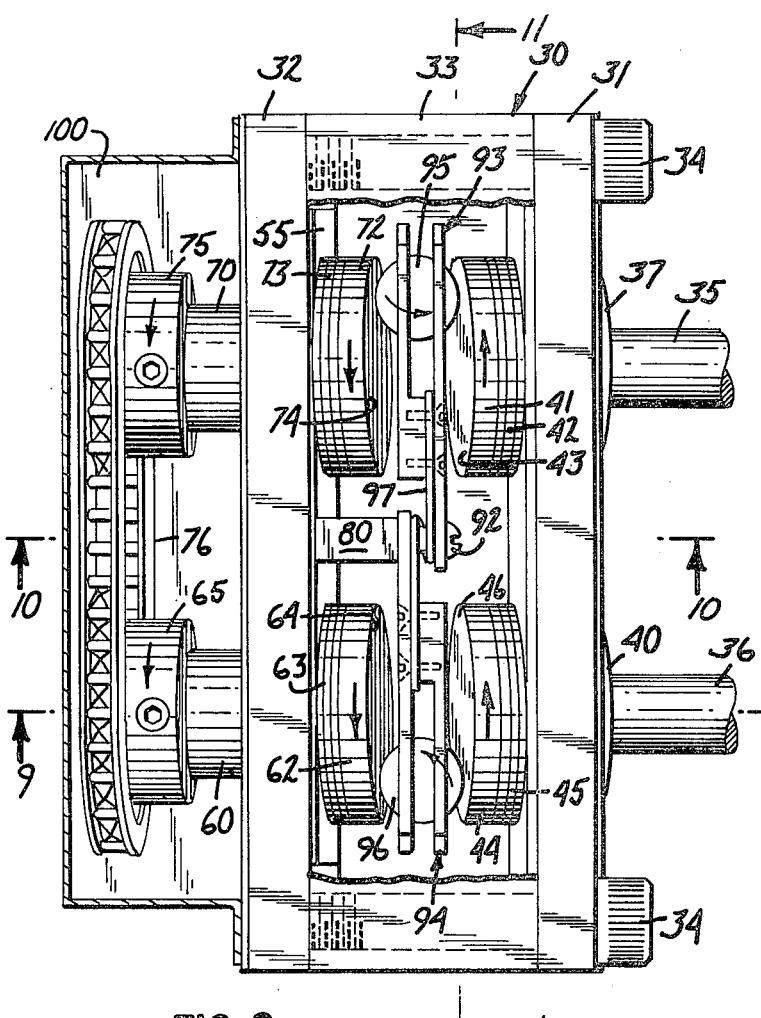
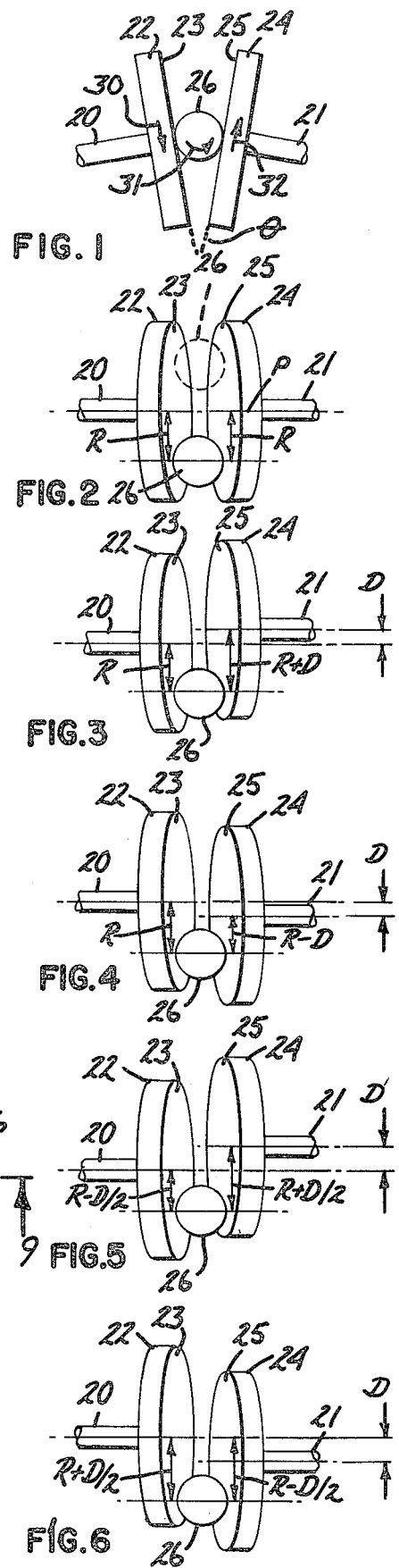

POWER TRANSMISSION MECHANISM

BACKGROUND OF THE INVENTION

This invention relates to the field of machine design, more specifically to an improved variable ratio power transmission mechanism.

Many such mechanisms are known. A frequent expedient is to provide first, driving and driven members interconnected by a further, coupling member movable to contact at least one of the first members at sites of different radius. Such contact between two cones is taught by Schott U.S. Pat. No. 3,698,255, between two discs by Whitmore U.S. Pat. No. 2,469,673 and between a cylinder and a disc by Weiss U.S. Pat. No. 2,503,310. In these prior art structures there is always a difficulty in adjusting the pressure applied by the coupling member, to insure rolling contact without slipping of the coupling member, at one extreme, or brinelling of one of the first members or crushing of the coupling member, at the other extreme. The prior art devices are also reversible, that is, they respond equally well to movement of the driving member in either direction. If it is desired to have a mechanism operate in only one sense, an additional overrunning clutch or similar mechanism must be employed.

SUMMARY OF THE INVENTION

My invention solves the problem of retaining adequate pressure between members in rolling contact by an arrangement in which the pressure in question is automatically increased when drive in a first direction is initiated: it has the added advantage of automatically decreasing the pressure if drive in the other direction is attempted. This I accomplish by the use of driving and driven members in the form of discs which are not parallel, but lie in planes defining a small dihedral angle. A rolling member is resiliently urged toward the vertex of the dihedral angle, and this bias is enhanced by a rudimentary wedging action when the desired drive is initiated. Reversal of the drive simply enables the coupling member to overcome the bias, so that no power transmission takes place. Ratio variation is accomplished by causing lateral displacement between the discs with simultaneous and proportional lateral displacement of the rolling member.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWINGS

In the drawing

FIGS. 1–6 inclusive are schematic diagrams to explain the principle of my improved mechanism;

FIG. 7 is a perspective view of a practical embodiment of the invention;

FIG. 8 is a top plan view of the structure of FIG. 7 with parts broken away or shown in section for clarity of illustration;

OPERATING PRINCIPLE

Figure 9:
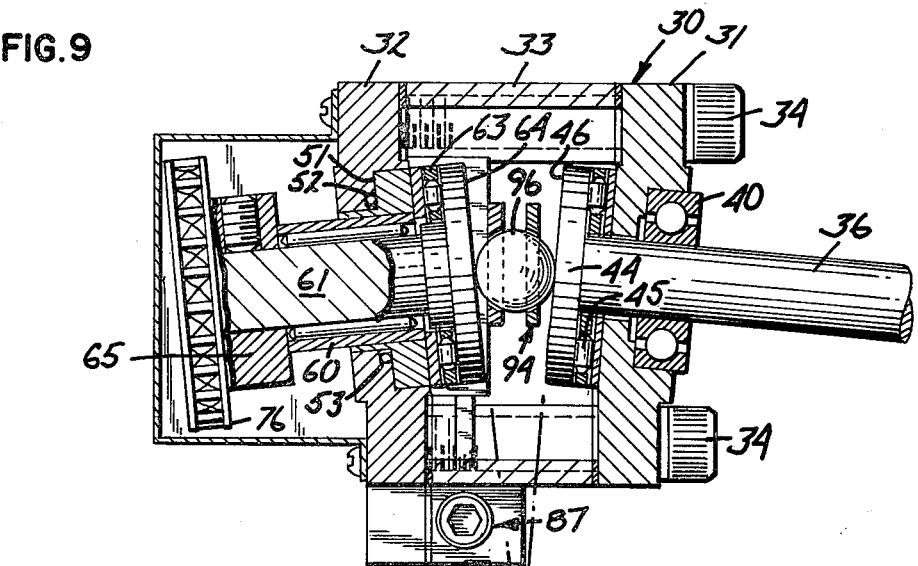
FIGS. 9 and 10 are sectional views generally along the lines 9—9 and 10—10 respectively of FIG. 8, with parts broken away for clarity.

In FIGS. 1-6, the operating principle of the invention is explained. FIG. 1 is an elevational view, and FIGS. 2-6 are plan views of the invention in different modes. In FIGS. 1 and 2 an input shaft 20 and an output shaft 21 are positioned so that their axes intersect at a small angle to define a vertical plane P. Shaft 20 terminates in a disc 22 having a flat surface 23, and shaft 21 terminates in a disc 24 having a flat surface 25 in spaced apposition to surface 23. Surfaces 23 and 25 define a pair of planes which intersect at a dihedral angle $\theta$. Rolling means in the form of a ball 26 contacts surfaces 23 and 25 along circles of radius R: the diameter of the ball is such that, if located in the plane P of the axes, it contacts the discs at the intersections of the axes with the planes of the discs. It will be evident that a ratio of R/R, or 1:1 takes place between the driving and driven shafts, that is, if shaft 20 rotates disc 22 through 30°, this causes rotation of ball 26 to drive disc 24 through a like angle of 30°. The direction of rotation of shaft 21 is opposite to that of shaft 20.

A number of basic facts should be noted. The first is that the ratio remains 1:1 regardless of whether ball 26 is close to or far from the axes of rotation of the shafts. The second is that for rotation in the direction shown by the arrows the action of the mechanism is to wedge ball 26 more tightly in the dihedral angle, and thus maintain an operative pressure between the ball and the disc surfaces. If for some reason driven shaft 21 begins to move faster than the speed produced by the drive, no effect is conducted back to driving shaft 20: instead ball 26 is simply lifted slightly out of the dihedral angle and slippage occurs there. The same result occurs if the direction of rotation of shaft 20 is reversed; again ball 26 is lifted out of the dihedral angle and no power is transmitted. The structure thus acts as a combined power transmission and overrunning clutch. The required vertical displacement of ball 26 is practically imperceptible.

Another basic fact to note is that in this mechanism the driving and driven functions can be reversed. However, driving from shaft 21 to shaft 20 can occur in a direction opposite to that of the arrows only.

Finally, it is to be noted that if ball 26 is in the position shown in FIG. 2 in broken lines, drive from shaft 20 to shaft 21 is in a direction opposite to that of the arrows, and drive from shaft 21 to shaft 20 is in the direction of the arrows. Overrunning, of course, is still available in the new directions.

As long as shafts 20 and 21 have the relative orientations shown in FIG. 2, the magnitude of the radius R at which ball 26 contacts each of the discs does not affect the ratio of the transmission, whether closer to or more remote from the axes. The closer the ball is to the axis, however, the greater force required to insure power transmission without slippage, and of course a location of the ball directly on the axes results only in wear on the ball and the discs.

The structure thus far described is not capable of ratio variation. To accomplish this a variation in the relative orientation of the shafts is provided. In FIG. 3, for example, shaft 21 has been displaced laterally by a distance D, with respect to shaft 20, while remaining parallel to its previous position. If ball 26 has retained a radius R from the axis of shaft 20, it is now at a greater radius R+D from the axis of shaft 21: shaft 21 now rotates R/(R+D) times as fast as shaft 20, the ratio R/(R+D) being less than unity. The absolute value of the ratio of course depends on the constants of any particular construction.

FIG. 4 shows that if the displacement of shaft 21 is in the opposite direction, the ratio of R/(R−D) becomes greater than unity.

From a practical point of view, if ball 26 is retained at a distance R from the axis of shaft 20, there is a tendency for a groove to form in surface 23 at that radius. This can be avoided if ball 26 is caused to move, in the direction of displacement D, by a proportional amount, as for example by D/2.

FIG. 5 is like FIG. 3 but here ball 26 is given the above described motion, so that its radius from the axis of shaft 20 is now R−D/2 instead of R, and its radius from the axis of shaft 21 is now R+D/2 instead of R+D, to give a ratio of (R−D/2)/(R+D/2).

FIG. 6 shows displacement D in the opposite direction, with accompanying movement of the ball by D/2. The radius of the ball from the axis of shaft 20 is now R+D/2 and its radius from the axis of shaft 21 is now R−D/2, to give a ratio of (R+D/2)/(R−D/2).

For purposes of illustration assume a structure in which R is ½ inch and D is ¼ inch. For FIG. 3 the ratio is 2:3 and for FIG. 4 it is 2:1, and the radius of the ball on disc 23 varies from ¾ to ¼ inch. In FIG. 5, the ratio is 3:5 and in FIG. 6 the ratio is 5:3, and the radius of the ball on both discs varies from ⅜ inch to ⅝ inch. Accordingly, FIGS. 5 and 6 can use a smaller disc 23, and the ball does not have to go so close to the axis of shaft 21, as incidental advantages to avoiding the formation of a groove in surface 23.

DESCRIPTION OF THE PREFERRED EMBODIMENT

Attention is now directed to FIGS. 7–11, which illustrate one practical embodiment of the invention. It includes support means 30 in the form of a first mounting plate 31 and a second mounting plate 32, spaced by a hollow housing 33 and assembled by suitable fasteners 34. An input shaft 35 and an output shaft 36 pass through apertures in plate 31 and are supported in radial bearings 37 and 40, respectively. Within housing 33 shaft 35 terminates in a disc 41 separated from plate 31 by a thrust bearing 42, and having a flat surface 43 perpendicular to the axis of the shaft, and shaft 36 terminates in a disc 44 separated from mounting plate 31 by a thrust bearing 45, and having a flat surface 46 perpendicular to the axis of shaft 21.

An elongated aperture 50 (see FIG. 11) is formed centrally in plate 32 and has a lip 51 grooved longitudinally at 52, 53 to receive antifriction balls 54 on which an elongated member 55 may roll longitudinally. Member 55 carries, in a radial bearing 60, a first stub shaft 61 which terminates within housing 33 in a disc 62 separated from member 55 by a thrust bearing 63, and having a flat surface 64 perpendicular to the axis of shaft 61. Outside of housing 33 shaft 61 carries a sprocket wheel 65. Member 55 also carries, in a second radial bearing 70, a second stub shaft 71 which terminates within housing 33 in a disc 72, separated from member 55 by a thrust bearing 73 and having a flat surface 74 perpendicular to the axis of shaft 71. Outside of housing 33 shaft 71 carries a second sprocket wheel 75 like wheel 65, connected to sprocket wheel 65 by a sprocket chain 76. The spacing between stub shafts 61 and 71 is the same as that between shafts 35 and 36.

Surfaces 43 and 46 are parallel and preferably coplanar, as are surfaces 64 and 74. Surfaces 43 and 74 are not parallel, but lie in planes which intersect at an acute dihedral θ of which the vertex is parallel to a line normal to the axes of shafts 61 and 71. Similarly, surfaces 46 and 64 are not parallel but lie in the same intersecting planes.

When member 55 is midway in its travel, the axes of shafts 35 and 71 intersect to define a first plane vertically transverse to housing 33, and the axes of shafts 36 and 61 intersect to define a second plane parallel to the first plane. As member 55 moves longitudinally of housing 33, the axes of shafts 61 and 71 move in unison, while remaining parallel to themselves.

The travel of member 55 and associated components is accomplished by a lever 80 pivoted at one end on a pin 81 fixed in plate 32 and passing through a slot 82 in member 55. Lever 80 is pivotally connected to member 55 by a screw 83 and extends therebeyond to terminate in a slot 84 engaging a cross pin 85 carried by a swivel 86 at the end of an adjusting screw 87 threaded at 90 into housing 33 and having an outer head or knob 91.

Pivotally connected to lever 80 by a screw 92 at a point midway between elements 81 and 83 are a pair of ball holders 93 and 94, apertured at their outer ends to act as a guide for a pair of balls 95 and 96, and urged into opposite directions about screw 92 by a torsion spring 97. The direction of action of spring 97 is such that the balls are urged toward the vertices of the dihedral angles, and the lengths of the holders are such that the balls engage discs 41 and 44 outwardly of their axes, and at equal radii from the axes when member 55 is in the middle of its travel.

A cover 100 encloses sprocket chain 76 and sprocket wheels 65 and 75 in oil tight relation, since the arrangement is designed to run in oil, not shown, and suitable oil seals, also not shown, are provided around shafts 35 and 36 where they pass through plate 31.

The diameters of balls 95 and 96 are such that when member 55 moves, the balls travel along radial paths on the disc surfaces.

OPERATION

The operation of my mechanism will now be explained, assuming first that member 55 is at the center of its travel, and that spring 97 is acting on ball carriers 93 and 94 to urge balls 95, 96 into the vertices of the dihedral angle.

When input shaft 35 drives disc 41 in the direction shown, ball 95 rotates as shown to cause the indicated rotation of disc 72, and at the same time the ball is wedged more tightly into the dihedral angle formed by surfaces 43 and 74, ensuring power transmission without slippage. The rotation of disc 72 is transmitted through sprocket wheel 75, sprocket chain 76, sprocket wheel 65, and shaft 61 to disc 62, the direction being indicated. Surface 64 engages ball 96 to urge it into the dihedral angle with surface 46, and ball 96 drives disc 44 to cause an output rotation of shaft 36 in the same direction as that of input shaft 35, and at the same speed.

Figure 11:
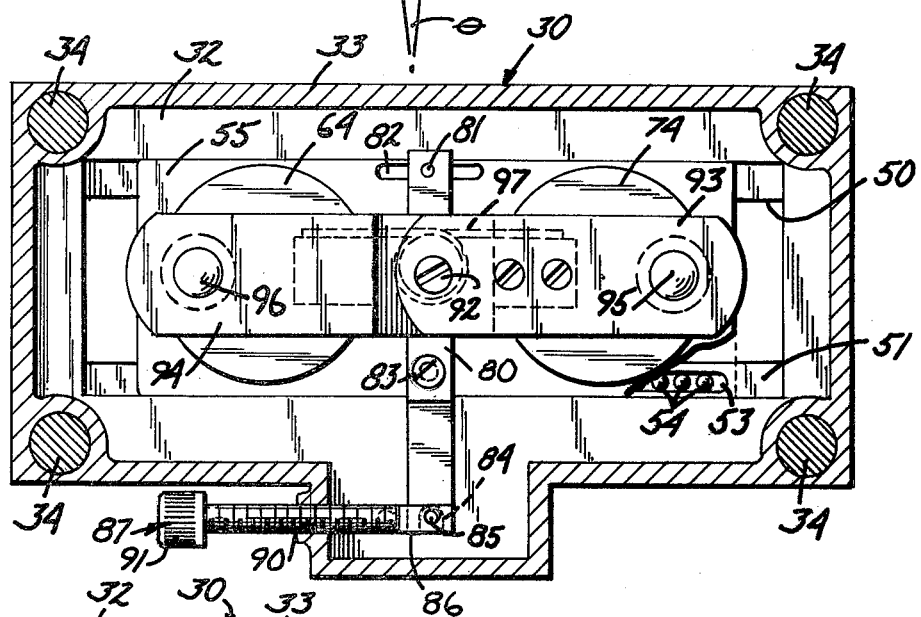
FIG. 11 is a similar sectional view generally along the line 11—11 of FIG. 8.
Figure 10:
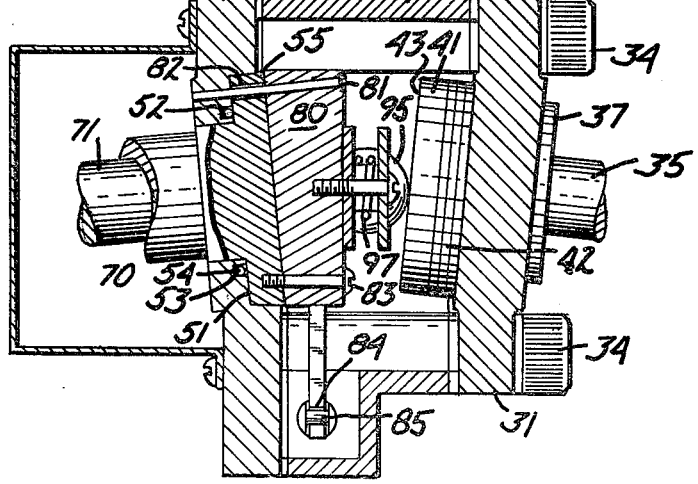

Now if knob 91 is turned to pivot lever 80 clockwise about pin 81 as seen in FIG. 11, member 55 is displaced to the left by screw 83, and ball carriers 93 and 94 are moved proportionally to the left, by screw 92. This results in a ratio greater than unity between input shaft 35 and stub shaft 71, and another ratio greater than unity between stub shaft 61 and output shaft 36. The overall ratio is thus greater than unity.

If, on the other hand, knob 91 is turned to pivot lever 80 counterclockwise about pin 81 as seen in FIG. 11, member 55 is displaced to the right by screw 83, and ball carriers 93 and 94 are moved proportionally to the right, by screw 92. This results in a ratio less than unity between input shaft 35 and stub shaft 71, and another ratio less than unity between stub shaft 61 and output shaft 36. The overall ratio is thus less than unity.

From the foregoing, it will be evident that I have invented a new variable ratio power transmission mechanism which is directional, and which is characterized by automatically increasing the force between rolling members when power is being transmitted.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. A variable ratio power transmission mechanism comprising, in combination:
    a driving member rotatable about a first axis and having a flat surface perpendicular to said first axis;
    a driven member rotatable about a second axis and having a flat surface perpendicular to said second axis;
    mounting means positioning said member in spaced apposition so that said surfaces define planes intersecting at an acute dihedral angle, said mounting means including ratio varying means for causing relative motion between said members in a direction aligned with the vertex of said dihedral angle;
    rolling means making contact with said surfaces along circles concentric with said axes;
    and means resiliently urging said rolling means toward the vertex of said dihedral angle.

2. A variable ratio power transmission mechanism comprising, in combination:
    a driving member rotatable about a first axis and having a flat surface perpendicular to said first axis;
    a driven member rotatable about a second axis and having a flat surface perpendicular to said second axis;
    mounting means positioning said members in spaced apposition so that said surfaces define planes intersecting at an acute dihedral angle;
    rolling means making contact with said surfaces along circles concentric with said axes;
    and means resiliently urging said rolling means toward the vertex of said dihedral angle;
    said mounting means including ratio varying means enabling relative movement between said members in a direction aligned with said vertex, accompanied by displacement of said rolling means in the same direction.

3. A mechanism according to claim 2 in which the displacement of said rolling means is proportional to the displacement of said mounting means.

4. A mechanism according to claim 2 in which the displacement of said rolling means is along lines intersecting said first and second axes.

5. A mechanism according to claim 4 in which the diameter of said rolling means is no less than the distance between parallel lines in said surfaces passing through said axes.

6. A mechanism according to claim 1 in which said rolling means engages both said driving members on the sides thereof outward from said axes.

7. A power transmission mechanism comprising, in combination:
    a pair of discs, having spaced apposed flat surfaces lying in planes which intersect at a small dihedral angle, and rotatable about axes perpendicular to said planes;
    rolling means between said discs engaging said surfaces at predetermined radii from said axes to transmit power therebetween;
    and mounting means for said discs and said rolling means adjustable to enable variation in the ratio of said radii, said mounting means being adjustable in a direction aligned with the vertex of said dihedral angle.

8. In combination:
    first and second mechanisms according to claim 1, arranged so that the vertices of said dihedral angles are aligned, and so that the first and second axes of the first mechanism are parallel respectively with the second and first axes of the second mechanism;
    means connecting the driven member of the first mechanism in driving relation to the driving member of the second mechanism;
    and means for activating the ratio varying means of both mechanisms unitarily.

9. In combination:
    first and second mechanisms according to claim 1;
    means connecting the driven member of the first mechanism in driving relation to the driving member of the second mechanism;
    and means for actuating the ratio varying means of both mechanisms unitarily.

10. In combination:
    first and second mechanisms according to claim 2;
    means connecting the driven member of the first mechanism in driving relation to the driving member of the second mechanism;
    and means for actuating the ratio varying means unitarily.

11. A plurality of mechanisms according to claim 1;
    means connecting said mechanisms in a sequence with the driven member of each preceding mechanism connected to drive the driving member of the successive mechanism;
    and means for actuating the ratio varying means of said mechanisms unitarily.

12. In combination:
    support means comprising first and second generally parallel mounting plates arranged for securement as ends to a housing which determines the spacing between said plates;
    input means comprising a shaft extending through and rotatable about a first axis in said first mounting plate, and terminating within said housing in a first disc having a flat surface perpendicular to said first axis;
    a first stub shaft extending through said second mounting plate and rotatable about a second axis therein, and terminating within said housing in a second disc having a flat surface perpendicular to said second axis;

a second stub shaft extending through said second mounting plate and rotatable about a second axis therein, and terminating within said housing in a third disc having a flat surface perpendicular to said third axis;

output means comprising a shaft extending through said first mounting plate and rotatable about a fourth axis therein, and terminating within said housing in a fourth disc having a flat surface perpendicular to said fourth axis;

mounting means carried by said second mounting plate for positioning said stub shafts so that said second and third surfaces are in spaced apposition to said first and fourth surfaces, respectively, and define therewith respectively pairs of planes intersecting at first and second acute dihedral angles;

first rolling means making contact with said first and second surfaces along circles concentric with said first and second axes;

second rolling means making contact with said third and fourth surfaces along circles concentric with said third and fourth axes;

means connecting said first stub shaft in driving relation to said second stub shaft;

ratio varying means operative to move said mounting means with respect to said second mounting plate, to cause relative movement between said second and first discs and said third and fourth discs, respectively, in directions aligned with said vertices of said dihedral angle;

and means resiliently urging said first and second rolling means toward the vertices of said first and second dihedral angle.

13. A structure according to claim 12 in which said ratio varying means further causes displacement of said first and second rolling means, in the same directions as those followed by said second and third discs respectively.

14. A structure according to claim 13 in which the displacement of said rolling means is proportional to the relative movement of said second and third discs with respect to said first and fourth discs.

15. A structure according to claim 12 in which said vertices of said dihedral angles are colinear and the movement of said mounting means is linear and parallel to said vertices.

16. A structure according to claim 13 in which the action of the ratio adjusting means causes movement of said first and second rolling means along lines which are radial with respect to said first and second axes and said third and fourth axes respectively.

17. In combination:
first and second discs having plane, parallel surfaces;
means mounting said discs for rotation in their own planes;
input means for causing rotation of said first disc;
output means rotatable with said second disc;
and means mechanically interconnecting said discs to transfer said rotation from said first disc to said second disc, including
further disc means mounted for rotation in a plane making a small dihedral angle with the planes of said first and second discs;
rolling means making contact separately between said first and second discs and said disc means;
and means causing lateral displacement between said disc means and said discs, and simultaneously causing proportional displacement of said rolling means in the same direction.

* * * * *